No. 788,355. PATENTED APR. 25, 1905.
R. F. FRAIZER.
TIRE TIGHTENER FOR VEHICLE WHEELS.
APPLICATION FILED JAN. 21, 1905.

Witnesses
Inventor
Robert F. Fraizer
Attorney

No. 788,355. Patented April 25, 1905.

UNITED STATES PATENT OFFICE.

ROBERT F. FRAIZER, OF CLOVERDALE TOWNSHIP, PUTNAM COUNTY, INDIANA.

TIRE-TIGHTENER FOR VEHICLE-WHEELS.

SPECIFICATION forming part of Letters Patent No. 788,355, dated April 25, 1905.

Application filed January 21, 1905. Serial No. 242,141.

*To all whom it may concern:*

Be it known that I, ROBERT F. FRAIZER, a citizen of the United States, residing in Cloverdale township, in the county of Putnam and State of Indiana, have invented certain new and useful Improvements in Tire-Tighteners for Vehicle-Wheels, of which the following is a specification.

My invention relates to devices for tightening the tires on vehicle-wheels and to that class of tighteners carried by the wheel, and has for its object the improvement of devices of this character by providing blocks with means for securing them to the ends of the tire and having screw-threaded bores to receive the respective ends of a right and left handed screw-threaded bolt. The outer ends of the bores in the blocks are made smooth to receive a shank on washers adapted to bear against the free ends of the felly. By this construction the felly is held in position while the tire is stretched on it in operating the screw-threaded bolt.

The construction, operation, and advantages of my invention will be fully explained hereinafter and illustrated in the accompanying drawings, in which—

Figure 1:
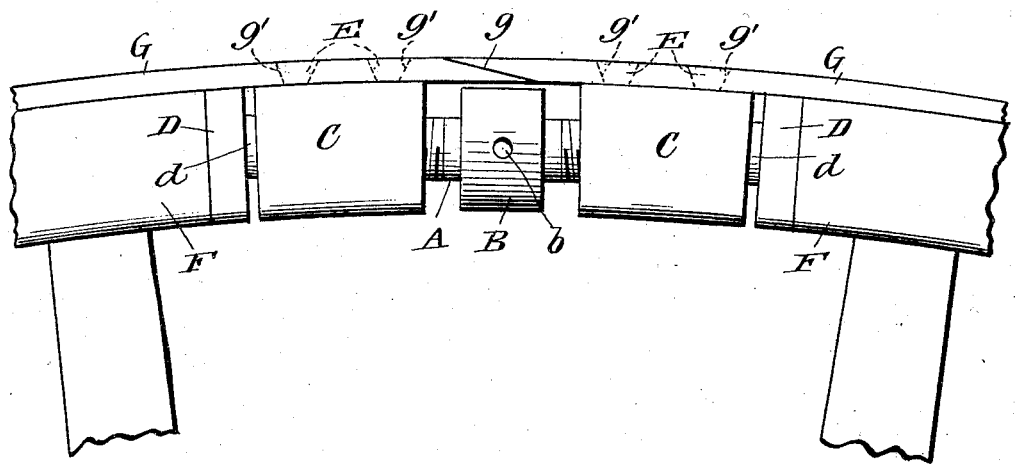
Figure 2:
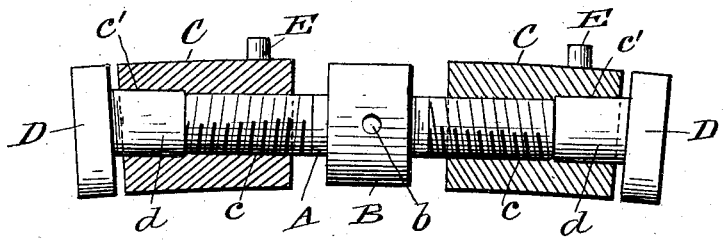

Figure 1 is a view of a fragment of a vehicle-wheel, showing my invention in position; and Fig. 2, a view showing the blocks in longitudinal section.

In the drawings similar reference characters indicate corresponding parts throughout both the views.

A represents a right and left handed screw-threaded bolt having an enlarged central portion B, with holes $b$ therein to receive a key for turning the bolt.

C C represent blocks having screw-threaded bores $c$ therein to receive the threaded portions of bolt A, the outer ends of said bores $c$ being smooth, as shown at $c'$, to receive the shanks $d$ of washers D.

E represents studs or projections on the blocks C C.

In securing my tightener to a vehicle-wheel a part of the felly F between two spokes is cut away to receive the device, the washers D bearing against the free ends of the felly, while the tire G is cut, as shown at $g$, with beveled faces and the studs or projections E are clenched into holes $g'$ in the tire.

In operation a key is used to turn the bolt A by inserting it in one of the holes $b$ in the central portion B. By turning the bolt in the proper direction the blocks C C are drawn together, thus tightening the tire G on the wheel, while the washers D, being held stationary by the ends of bolt A bearing against the ends of shanks $d$, hold the felly F from following the motion of the tire in tightening.

Having thus described my invention, what I claim is—

1. In combination with a vehicle-wheel having the felly cut away and the tire cut opposite thereto, a tire-tightener mounted in said cut-away portion consisting of blocks secured to the ends of the tire and having bores therethrough, a part of said bores being screw-threaded and part being smooth, a right and left hand screw-threaded bolt to engage the screw-threads in said blocks, and washers bearing against the free ends of the felly having shanks to fit into the smooth parts of said bores, substantially as shown and described.

2. In combination with a vehicle-wheel having its felly cut away, the tire cut opposite said cut-away portion on beveled planes and having holes near the free ends thereof, blocks having studs integral therewith secured in the holes in the tire, a right and left hand screw-threaded bolt, bores in said blocks having threads to engage the threads on said bolt, the outer ends of said bores being smooth, and washers bearing against the free ends of the felly and having shanks to fit into the smooth parts of said bores, substantially as shown and described.

In testimony whereof I hereto affix my signature in the presence of two witnesses.

ROBERT F. FRAIZER.

Witnesses:
C. E. AKERS,
C. M. WATSON.